United States Patent Office 2,917,400
Patented Dec. 15, 1959

2,917,400

BENEFICIATED IRON OXIDE PIGMENT AND COATING COMPOSITIONS CONTAINING SAME

Webster Harold Edwards, Springfield, Pa., assignor to E. I. du Pont de Nemours and Company, Wilmington, Del., a corporation of Delaware No Drawing. Application April 15, 1957
Serial No. 652,651

18 Claims. (Cl. 106—243)

This invention relates to beneficiated hydrous iron oxide pigment and to coating compositions containing the same. More particularly, the invention relates to a method of beneficiating hydrous iron oxide pigment to provide a hydrophobic iron oxide pigment product having a particle-size below the light-scattering level and to organic coating compositions and finishes containing this pigment which exhibit superior transparency, brilliance, two-tone effect and jetness of masstone in comparison with coating compositions and finishes containing ordinary hydrous iron oxide pigment transferred to the organic film-forming compositions by methods well known to the art.

The value of iron oxide pigments in coating compositions is well established and although they provide durable coatings, the coatings pigmented with ordinary iron oxide do not have significant aesthetic appeal. Common iron oxide pigments ordinarily have a particle-size diameter in the range of about 250 to about 600 millimicrons. Because this particle-size is significantly above the light-scattering level, compositions pigmented with these ordinary iron oxide pigments are opaque and have good hiding power.

U.S. Patent 2,335,760 teaches a method of preparing hydrous iron oxide pigments having an average particle-size diameter of less than 100 millimicrons, ordinarily less than 50 millimicrons, and a method of transferring water-wet pulp of such hydrous iron oxide pigment to lacquer coating compositions to provide durable finishes which are substantially transparent. Such pigment provided a basis for formulating glamorous metallic finishes for automobiles of which "Duco" Lacquer Metalli-Chrome Enamels are representative. However, the particle size distribution of this pigment includes a significant proportion of particles larger than the average particle size and ranging up to 300 millimicrons which are in the light scattering range causing the pigmented coatings prepared therefrom to vary in brilliance and transparency and to occasionally exhibit an undesirable milky or muddy appearance.

An important object of this invention is to provide a beneficiated hydrous iron oxide pigment product free of pigment particles having a diameter which scatter ordinary light.

Another important object is to provide a beneficiated hydrophobic hydrous iron oxide pigment product which is readily dispersible in a hydrophobic organic film-forming material by mixing without expenditure of a significant amount of mechanical energy at a high rate.

A further object is to provide organic coating compositions and finishes containing the beneficiated hydrous iron oxide pigment which are characterized by superior transparency and brilliance of appearance.

Still another object is to provide a method of beneficiating hydrous iron oxide pigment to supply the improved pigment product characterized above.

In preparing the beneficiated pigment product of the present invention, water-wet hydrous iron oxide pigment having an average particle-size diameter in the range of about 10 millimicrons to 100 millimicrons and containing pigment particles of a size capable of scattering ordinary light is beneficiated by treating the pigment with a hydrophobic aliphatic monocarboxylic acid in the presence of a volatile water-immiscible organic solvent for the acid whereby the pigment is provided with a hydrophobic surface bound by salt linkages, separating free water from the pigment composition, and fractionating the resulting dispersion of the hydrophobically coated pigment particles in the water-immiscible volatile oragnic liquid by centrifugal means in which the developed forces are from about 6000 G to about 70,000 G, that is, from about 6000 to about 70,000 times the force of gravity, to separate therefrom, as a pigment sludge, pigment particles of a size capable of scattering light and retaining dispersed in the organic liquid pigment particles which are incapable of scattering light. The proportion of hydrophobic monocarboxylic acid to iron oxide content of the pigment is in excess of the amount which can be bound to the iron oxide surface by salt linkages and ordinarily ranges from about .2 part to about 1.2 parts per part of iron oxide by weight determined as muffle furnace ash content of the starting pigment.

Coating compositions are prepared by mixing the beneficiated hydrous iron oxide pigment particles dispersed in the water-immiscible volatile organic liquid with a hydrophobic organic film-forming material in the presence of a volatile organic liquid which is an adequate diluent for the hydrophobic film-forming material. These coating compositions on loss of the volatile organic liquid deposit finishes which on drying or curing exhibit unusual transparency, two-tone effect and jetness of masstone.

Hydrous iron oxide pigment starting parent materials which are beneficiated by the methods of this invention are represented by water-wet pigment pulps of hydrous ferric oxide and ferrous/ferric oxide for which the preparation is described in U.S. Patents 2,335,760 and 2,466,770. These starting pigment materials have an average particle-size diameter of less than 100 millimicrons, ordinarily less than 50 millimicrons, and generally in the range of about 10 millimicrons to 30 millimicrons with these averages representing particles ordinarily ranging from 1 to about 200 millimicrons with some particles as large as 300 millimicrons. The content of bound water of these hydrous iron oxide pigments ordinarily corresponds to about 15% by weight based on the dry weight of the pigment pulp.

While the examples which follow specificially describe beneficiation of hydrous ferric oxide pigment, the techniques described are equally applicable with comparable beneficiation of pigment pulps derived by coprecipitation of ferric oxide with hydrous oxides of ferrous iron, chromium, aluminum, manganese or nickel.

In the general procedure of preparing hydrous ferric oxide pigment, an aqueous solution of a soluble ferrous salt, such as ferrous sulfate, is oxidized to the ferric salt, and the pigment is struck from the solution by addition of a soluble hydroxide, such as caustic soda, to precipitate the hydrous ferric oxide which is then washed substantially free from water extractable salts.

In the practice of this invention, the resulting hydrous iron oxide pulp of known iron oxide content is added to a solution of hydrophobic aliphatic monocarboxylic acid in a water-immiscible volatile organic solvent for the acid and agitated. In this treatment a substantial portion of the acid is bound to the surface of the pigment particle by salt linkages, thereby providing the pigment particle with a hydrophobic surface and causing liberation of water.

Lauric acid or coconut oil fatty acids are particularly preferred as the hydrophobic salt-forming reactant. Individual aliphatic monocarboxylic acids saturated or ethylenically unsaturated, having from 6 to 24 carbon atoms per molecule and mixtures thereof are operative and can be substituted for the particular acids specified in the following examples, the substitution preferably being made on a molecular equivalent basis. Saturated aliphatic acids having from 8 to 16 carbon atoms per molecule are preferred. Fatty acids useful individually or in admixture include: lauric, capric, caprylic, caproic, myristic, palmitic, stearic, carnaubic, behenic, margaric, pentadecanoic, tridecanoic, undecanoic, pelargonic, nondecanoic, arachidic, lignoceric, oleic, erucic, palmitoleic, linoleic, linolenic, dehydrated castor oil acids and tall oil fatty acids.

The proportion of fatty acid to ferric oxide content of the starting pigment as determined as muffle furnace ash can range from about .2 part to about 1.2 parts by weight for each part of ferric oxide ($Fe_2O_3$), preferably using low molecular weight species of acid at the low side of the range, high molecular weight species at the high side of the range, with intermediate acids, such as lauric acid, being satisfactory over the entire range. The preferred range is .3 to .8 part of 8 to 16 carbon atom fatty acids per part of ferric oxide. Treatment of the hydrous iron oxide pigment according to this invention with the indicated operative range of fatty acid ordinarily results in 30% to 99% of the fatty acid being bound by salt linkages.

It has been established that because of steric hindrance of the fatty acid molecules containing at least 8 carbon atoms, only about 40% of the surface area of the pigment particle can be molecularly coated with fatty acid bound by salt linkages. Analytical measurement of the free fatty acid content and the content of surface-bound fatty acid in reference to the content of $Fe_2O_3$ provides a means for approximating the surface area and size of the iron oxide core of the pigment particle.

In carrying out the initial step of treating the water-wet pigment pulp with the hydrophobic acid, any water-immiscible volatile organic liquid boiling in the range of 80° C. to about 200° C. can be used as the diluent for the hydrophobic acid provided the liquid is: a solvent for the acid, capable of functioning as a means for volatile removal of water, non-reactive under the treating conditions, and adequate as a compatible diluent in the liquid coating composition in which the beneficiated pigment product is incorporated. Hydrocarbons such as toluol, xylol, high solvency petroleum naphthas and mineral spirits are preferred diluents. Xylol and toluol are particularly preferred diluents because they are most adaptable for use in a wide variety of organic coating compositions.

The content of the volatile organic diluent in the initial step of treating the pigment with the hydrophobic acid is not significantly critical and can be varied to provide a desired consistency of the slurry for agitation during treatment. Ordinarily 25% to 75% by weight of the organic diluent based on the total weight of the fatty, dry weight content of the water-wet pigment pulp and the organic diluent is a practical range. A content of volatile organic diluent in the range of 30% to 50% on the indicated basis is preferred. Use of less than 25% of the diluent requires a longer processing time to reach equilibrium and use of more than 75% offers no advantages and may require diluent removal at a later stage to provide a practical concentration of pigment in the finished product.

The hydrophobic treatment of the water-wet pigment is preferably carried out at a temperature in the range of about 50° C. to about 70° C. While lower temperatures with a longer treating cycle can be used, it is desirable to avoid temperatures which cause precipitation of the fatty acid from solution. Higher temperatures, up to the boiling point of the volatile constituents can be used, but it is preferred to operate at a lower temperature to permit removal of a major proportion of the free water by decantation and then raise the temperature to remove the remaining free water by azeotropic distillation.

The preferred treating cycle is about 60 minutes with moderate agitation. The cycle can be as short as about 30 minutes when the slurry contains a high concentration of the diluent and even as short as 15 minutes if additionally the agitation is relatively vigorous. Ordinarily there is no advantage in extending the cycle beyond one hour unless the slurry is dense and agitation is mild. There are no adverse effects when the treating cycle is extended to 8 hours.

After the initial treating cycle, agitation and heating is stopped to permit water separation. Ordinarily this settling stage represents 30 to 60 minutes. A major proportion of water will separate out in 15 minutes to permit its removal by decantation. The length of the settling cycle is not critical inasmuch as any free water not removed by decantation is subsequently removed by distillation. Alternatively, the separated water can be removed by ordinary centrifugal means representing centrifugal forces of low magnitude.

After decantation of the water, moderate agitation of the residual composition is resumed and heating is advanced to initiate distillation for removal of the remaining free water. Distillation is continued until no further separation of water is observed or until the temperature of the distillate corresponds with that of the organic solvent which ordinarily is higher than 100° C.

The resulting fluid dispersion of hydrophobic hydrous iron oxide pigment product in the volatile organic diluent for the hydrophobic monocarboxylic acid is then subjected to fractionation by centrifugal means to remove, as a pigment sludge, any pigment particles of a size capable of scattering ordinary light. Although the centrifugal fractionation of the hydrophobic pigment can be satisfactorily accomplished at the ordinary concentration of the immediately preceding stage after removal of the free water, it is more convenient and a better separation is effected if the volatile organic diluent represents at least 50% by weight of the composition. It is preferred to carry out the centrifugal operation at a concentration in the range of about 25% to 50% by weight of total monocarboxylic acid and pigment. The fractionation can be conducted at still lower concentrations, the desired practical concentration of pigment in the final product dictating the starting concentration.

Fractionation is preferably carried out at centrifugal forces corresponding to the range of 9,000 G to 16,000 G which are representative of centrifugal forces obtained in commercially operated centrifuges and super centrifuges. Separators which develop a centrifugal force of the order of 6000 G to 9000 G can be used, but at this level the rate of separation is slower than is ordinarily desired in commercial operations. Still lower levels of centrifugal force can be used to effect fractionation, but a centrifugal force significantly below 6000 G is impractical except for experimental purposes. Ultra-centrifuges which develop centrifugal forces up to 70,000 G can be used to rapidly effect the fractionation, but such devices are available only in laboratory size which is inadequate for commercial production of the beneficiated product.

The fractionation time or settling cycle to effect removal of particles capable of scattering ordinary light as a pigment sludge varies with the particular dimensions of the centrifuge and the magnitude of the gravitational forces developed therein. In the practice of this invention, adequate fractionation corresponds to that which provides a product which when subjected to further fractionation with a 100,000 r.p.m. ultra-centrifuge having a cylinder inside diameter of one inch, such as used in blood analysis, causes separation of not more than 3% by volume of solids based on the total volume of solids during a 15 minute period of fractionation in the indicated centrifuge. Fractionation which provides at least this quality of product is accomplished using a fractionation time ranging from about 30 minutes using a centrifuge in which a force corresponding to 6000 times the force of gravity, 6000 G, is developed to about 2 minutes at a centrifugal force of about 70,000 G. For ordinary commercial centrifuges and super centrifuges in which forces of 9000 G to 16,000 G are developed, a suitable fractionation time ranges from about 18 minutes to about 6 minutes respectively. In continuous operation of centrifugal fractionation, the desired fractionation time or settling cycle is controlled by the rate of feed to the centrifuge. Feed rates ranging from about 10 gallons per hour at 9000 G to about 75 gallons per hour at 16,000 G are practical in commercial operations. With the laboratory model Sharples Model 1A Ultra-Centrifuge, a feed rate ranging from about .3 gallon per hour at 9000 G to about 2 gallons per hour at 60,000 G provided the desired settling cycle.

The beneficiated hydrophobic hydrous iron oxide pigment product of this invention dispersed in the volatile solvent for the hydrophobic monocarboxylic acid is readily dispersed by simple mixing in fluid compositions comprising a hydrophobic organic film-forming material and a volatile organic liquid representing a diluent and/or solvent therefore. High shearing forces and high amounts of mechanical energy ordinarily associated with the dispersing of pigments are not required to disperse the pigment product in the coating composition. In mixing the beneficiated pigment product, preferably containing an aromatic hydrocarbon solvent as the diluent, with the film-forming component of the coating composition it is preferred that the volatile organic liquid representing a diluent and/or solvent for the film-forming material contains a preponderance of volatile hydrocarbon when the pigment and the film-forming material are initially combined. After the pigment is uniformly mixed into the composition, other volatile organic diluents and/or solvents are added, such as esters, ketones, alcohols, and petroleum naphthas, to obtain the desired solvent balance for the particular film-forming material used.

Choice of volatile organic solvents and diluents is not critical. Any of the volatile organic solvents and mixtures of solvents and diluents ordinarily used as the volatile organic liquid in the formulation of organic coating compositions which deposit the film-forming material as a clear transparent film on volatile loss of the organic liquid can be used. It is desirable that the solvents and diluents be dry, that is, sufficiently free from water that the final liquid coating composition contains less than 1.2% by weight of water, preferably less than .7% of free water.

Organic polymers suitable as the hydrophobic film-forming material include for example: cellulose nitrate, cellulose acetate, cellulose propionate, cellulose acetobutyrate, ethyl cellulose, polyster resins, oil modified alkyd resins, urea/formaldehyde resins, melamine/formaldehyde resins, polyether resins such as derived from bis-phenol and epichlorohydrin, vinyl acetate homopolymers and copolymers, vinyl propionate homopolymers and copolymers, vinyl chloride homopolymer and copolymers, vinyl acetal polymers, methyl methacrylate polymers, butyl methacrylate polymers, ethyl acrylate polymers, acrylonitrile/acrylic ester copolymers, acrylonitrile/methacrylate ester copolymers, styrene/acrylic ester copolymers, butadiene 1,3 homopolymers, butadiene 1,3/acrylonitrile copolymers, butadiene 1,3/styrene copolymers, polymeric dihydric alcohol diesters of methacrylic acid, oleoresinous varnishes, glyceride drying and semidrying oils.

These organic film-forming materials can be in admixture with compatible modifiers, such as plasticizers for the film-forming component. The composition can also include other adjuvants at ordinary concentrations, such as metallic driers, silicone fluid, fungicides, inhibitors, thixotropy agents, and ultra-violet screening agents.

The compositions can contain other transparent pigments and light stable organic coloring matter to modify the color produced by the iron oxide pigment product of this invention. Because the significant characteristic of the invention pigment is the increased brilliance or transparency, use of significant proportions of opaque pigments which mask the advantages of the beneficiated iron oxide pigment is ordinarily avoided. The presence of reflective aluminum flake pigment or bronze flake pigment in the composition to provide metallic finishes enhances the brilliance and increases the two-tone effect. The proportion of metallic flake can be varied widely, but preferably it should not be at a level at which the metallic opacity is significant and the transparency of the iron oxide pigment is obscured.

The coating compositions can vary widely in non-volatile content. It is practical to apply the coating compositions at a non-volatile content as low as 5% and some coatings can be applied at a non-volatile content of about 60% by weight. The ordinary range of non-volatile content is about 15% to 45% by weight. The proportion of beneficiated pigment to total organic film-forming material preferably is in the range of about 10 parts to 40 parts of the pigment for each 100 parts by weight of organic film-forming material. It is practical to use as little as 5 parts of pigment on the indicated basis, but the color contribution at this level is very small. Compositions can contain as much as 50 parts of the pigment on the indicated basis but at this level, the fluid compositions are susceptible to gelation during storage.

The following examples illustrate certain preferred embodiments of the invention. All parts are on a weight basis unless otherwise indicated.

EXAMPLE 1

(A) *Preparation of hydrous ferric oxide pigment*

278 parts of ferrous sulfate ($FeSO_4 \cdot 7H_2O$) were dissolved in 1000 parts of water and to this solution were added 18.6 parts of sodium chlorate ($NaClO_3$) and 49 parts of sulfuric acid (100% basis). The solution was heated to about 82° C. and held at this temperature for about 30 minutes to oxidize the ferrous iron to ferric iron. A solution of 117 parts of caustic soda in about 500 parts of water was slowly added to the resulting solution of ferric sulfate over a period of about 20 minutes to precipitate the ferric iron as a hydrous ferric oxide. After addition of the caustic, the aqueous slurry had a pH of about 4.0. Ordinarily the pH will be in the range of 3 to 5 and more or less caustic may be used to obtain the preferred pH of 4.0. After striking the pigment, the aqueous slurry was maintained at a temperature in the range of 82° C. to 88° C. and stirred with moderate agitation for about 2 hours. Thereafter the precipitated hydrous ferric oxide pigment was separated from the mother liquid and washed with water until the filtrate was free from water-extractable sulfates and chlorides.

(B) *Hydrophobic treatment of water-wet hydrous ferric oxide pigment*

159 parts of commercial lauric acid (refined coconut oil fatty acids containing about 95% lauric acid) were dissolved in 378 parts of industrial xylol (B.R. 135° C. to 146° C., A.P. —44° C.) in a vessel equipped with means for agitation, heating, decantation and distillation. The mixture was heated to about 50° C. and moderately agitated to facilitate dissolution of the fatty acids. To the resulting solution was added an amount of the above described water-wet hydrous ferric oxide pigment corresponding to 463 parts of dry weight of pigment. Moderate agitation and heating of the mixture at a temperature in the range of 50° C. to 60° C. was continued for about one hour. Then agitation and heating was stopped and mixture was allowed to separate into a hydrophobic phase and a water phase during a 30 minute settling period. The water phase was removed by decantation. After this initial removal of water, the residual composition in the transfer kettle was heated to about 92° C. and the remaining water was removed by azeotropic distillation. Distillation was stopped when the vapor temperature reached 135° C. The residual fluid hydrophobic pigment product, free from unbound water, consisted essentially of ferric oxide pigment surface coated with lauric acid bound by salt linkages, a small proportion of the fatty acids uncombined and industrial xylol as the volatile organic diluent.

(C) Pigment fractionation

The residual fluid pigment composition of the described process step B, wherein the water-wet hydrous ferric oxide pigment was transferred to the hydrophobic organic vehicle, had a non-volatile content of about 60% by weight. This fluid composition was diluted with industrial xylol in the proportion of 1 part of xylol by weight for each two parts of this residual composition to provide the diluted product with a non-volatile content of about 40% by weight. This diluted product was then subjected to fractionation by centrifugal means in which high centrifugal forces are developed.

A Model 1A Sharples Ultra-Centrifuge operated at 50,000 r.p.m. provided a centrifugal force of about 62,000 G. Operated at lower speeds, centrifugal forces comparable to those found in commercial production centrifuge units, such as 16,000 G for a super-centrifuge and 9500 G for Sharples D–2 series. This latter force was developed in the Model 1A at 19,500 r.p.m.

The desired pigment settling cycles corresponding to the indicated centrifugal forces were:

| Force: | Cycle, seconds |
|---|---|
| 62,000 G | 140 |
| 16,000 G | 540 |
| 9,500 G | 910 |

In a typical fractionation at 16,000 G a lot of the fluid hydrophobic pigment dispersion from step B at 40.53% non-volatile content was fed into the centrifuge at about 26 ml. per minute and the fluid product, pigment sludge and rework was recovered. A second lot was similarly fractionated initiating with a non-volatile content of 46.1% fed at a rate of 35 ml. per minute recovering the fluid product, pigment sludge and rework. A third lot was similarly fractionated initiating with a non-volatile content of 37.7% fed at a rate of 35 ml. per minute recovering the fluid product, pigment sludge and rework. The entire amount of rework was combined and fractionated as lot 4. In continuous commercial operation of the centrifugal separation, no rework is involved as compared with batch operations. The respective lots of fluid beneficiated pigment product and pigment sludge were separately analyzed for non-volatile content, $Fe_2O_3$ content as muffle furnace ash, water content and fatty acid content. There was no significant analytical difference between the respective lots of the product. The respective lots of pigment sludge were similarly found to be analytically equivalent. The weight ratio of fatty acid to $Fe_2O_3$ in the feed composition was .612, the average ratio in the beneficiated product was .813 and the average ratio in the recovered sludge was .308. Of the respective proportions of fatty acid present in the feed, product and pigment sludge, less than 5% was extractable as free fatty acid, indicating that in each case at least 95% was bound by salt linkages.

Using the proportion of fatty acid chemically bound to the surface area of one gram of iron oxide pigment particles and the recognized dimensions of 51.1 A.$^2$ (A=Angstrom) cross-sectional area and 18.45 A. length for a single molecule of lauric acid, the specific surface of the $Fe_2O_3$ particles expressed in square meters per gram can be approximated. The particle diameter of the $Fe_2O_3$ core of the beneficiated pigment can be approximated therefrom using the equation $$\text{Particle diameter} = \frac{6}{5.24(\text{specific surface } Fe_2O_3)}$$

cited in E. K. Fischer's "Colloidal Dispersions," John Wiley and Sons, Inc. (1950), 5.24 representing the density of $Fe_2O_3$. The average pigment particle $Fe_2O_3$ core diameter based on this approximation ordinarily was of the order of magnitude in the range of about 1 millimicron to 10 millimicrons. The average particle diameter of the beneficiated hydrophobic pigment particles corresponds to the average $Fe_2O_3$ core diameter plus 36.9 A. representing the length of two molecules of lauric acid.

The ratio of bound acid to $Fe_2O_3$ in the centrifugally fractionated beneficiated pigment product was greater than the ratio in the feed composition indicating a greater surface area and correspondingly a smaller average particle size than in the feed. The pigment sludge removed by centrifugal fractionation contained a significantly lower ratio of bound acid per unit weight of $Fe_2O_3$, indicating that the pigment particles in the sludge are significantly larger and the surface area per unit weight is smaller in reference to the beneficiated product. The water content of the pigment sludge was significantly greater than that of the product, further indicating that the pigment particles in the sludge are of larger diameter and contain relatively more bound water which is not exposed at the surface of the pigment particle.

EXAMPLE 2

A beneficiated hydrophobic ferric oxide pigment product was prepared in the same manner as described in Example 1 with the exception that in the transfer step B a relatively greater proportion of the lauric acid was used. In this step, 218 parts of refined coconut oil fatty acids corresponding to that used in Example 1 were dissolved in 400 parts by weight of industrial xylol, heated to about 60° C. and an amount of water-wet hydrous ferric oxide corresponding to 382 parts of dry weight pigment were slowly added to the solution of fatty acid. After the mixture was agitated for one hour while maintained at a temperature in the range of 50° C. to 60° C., agitation and heating was stopped and the mixture was allowed to settle for 15 minutes. The separated water layer was removed by decantation and the residual material was heated with agitation to about 92° C. and azeotropic distillation was initiated to remove the remaining water. Distillation was stopped when the vapor temperature reached 135° C.

This fatty acid treated product was diluted to about 40% non-volatile content with xylol and then beneficiated by centrifugal fractionation as described in step C of Example 1 into a clear liquid product free from pigment particles which scatter light and a pigment sludge containing pigment particles which scatter light. Except for the content of uncombined fatty acid, this beneficiated pigment product was equivalent to the product of Example 1. Analysis of the product and the sludge for bound and free fatty acid indicated that the salt-linked fatty acid was the same as that of the product and sludge in Example 1 and that the free acid represented the excess corresponding approximately to the difference in total fatty acid between Examples 1 and 2.

EXAMPLE 3

Another beneficiated pigment product was prepared following the procedure described in Example 1 with the exception that tall oil fatty acids were substituted on a molecular basis for the commercial lauric acid in step B embracing transfer of the water-wet ferric oxide pigment pulp to the hydrophobic organic medium. The average molecular weight of tall oil fatty acids is 280 in comparison with 200 for lauric acid. Hence, in the transfer stage, 195 parts of tall oil fatty were dissolved in 400 parts of industrial xylol for treatment of an amount of water-wet pigment corresponding to 405 parts of dry weight pigment. After water removal by decantation and azeotropic distillation, and centrifugal fractionation as described in step C to remove the pigment sludge containing pigment particles which scatter light, the resulting beneficiated pigment product was equivalent to the product of Example 1. Analytically on a weight basis, this product had a fatty acid content intermediate between that of Example 1 and that of Example 2.

Coating compositions

In the preparation of coating compositions, the beneficiated pigment products of the foregoing examples were simply mixed with hydrophobic organic film-forming materials in the presence of suitable organic diluents and/or solvents for the film-forming material. The following examples are representative coating compositions which are adequately durable for use as automobile finishes or as tinting enamels to be used in combination with metallic tinting enamels or ordinary pigment tinting enamels in the preparation of such finishes.

EXAMPLE 4

*Lacquer enamel*

| First portion: | Parts by wt. |
|---|---|
| High solvency petroleum naphtha (B.R. 95°–142° C., A.P. 16° C.) | 7.3 |
| High solvency petroleum naphtha (B.R. 130°–195° C., A.P.—13° C.) | 2.0 |
| Blown castor oil | 4.8 |
| Cellulose nitrate-isopropyl alcohol wet—70% non-volatile content | 20.0 |
| Methyl isobutyl carbinol | 4.5 |
| Second portion: | |
| Pigment product of Example 1—40% non-volatile content in xylol | 8.0 |
| Third portion: | |
| Butyl acetate | 5.8 |
| Methyl amyl acetate | 6.8 |
| Methyl isobutyl ketone | 4.0 |
| Fourth portion: | |
| Methyl isobutyl ketone | 9.4 |
| Methyl ethyl ketone | 10.1 |
| Dibutyl phthalate | 2.5 |
| Coconut oil modified alkyd resin solution 70% non-volatile content in toluol | 8.0 |
| Silicone solution .25% in toluol | 1.0 |
| Isopropyl acohol—anhydrous | 5.8 |
| | 100.0 |

The cellulose nitrate was the ordinary lacquer grade having a viscosity of about 4 seconds in Formula B ASTM Designaton D–301–33.

The alkyd resin was a 53% oil length coconut oil modified glyceryl phthalate resin having an acid number of about 2 and a hydroxyl content corresponding to 3.2% of glycerine.

The silicone solution used as a surface active agent to provide desirable surface effects was General Electric's Silicone Fluid SF–3.

The ingredients of the first portion were added in the order indicated and mixed for 30 minutes to form a slurry of the cellulose nitrate in the diluent mixture which does not dissolve the cellulose nitrate. The second portion was added to the slurried first portion and mixed for about three hours. Then the ingredients of the third portion were added and the combined portions were mixed for about two hours, the solvency of the solvent/diluent mixture of organic liquids now being sufficient to solubilize the cellulose nitrate. Then the ingredients of the fourth portion were added and the combined portions were mixed until the product was uniform. A coating of this product on volatile loss of solvent deposited a clear, transparent, brown film. While this film represents a durable coating which resists weathering ordinarily encountered by an automobile finish, the composition of Example 4 preferably is used as a tinting enamel in the preparation of brilliant, glamorous metallic finishes, admixing with the tinting enamel an appropriate amount of aluminum flake or paste predispersed in a film-forming composition essentially the same as that of the beneficiated ferric oxide tinting enamel. Ordinarily the aluminum tinting enamel contains about 5% by weight of aluminum and this tinting enamel was combined with the product of Example 4 in the proportions of .5 part to about 20 parts of the aluminum tinting enamel and 99.5 to 80 parts of the product of Example 4.

Metallic enamels prepared in this manner exhibited a significantly greater degree of two-tone effect than the corresponding metallic enamels prepared from the starting hydrous ferric oxide pigment which was not beneficiated by the fatty acid treatment and centrifugal fractionation as described in the practice of this invention.

A tinting enamel equivalent to that of Example 4 was obtained when 9.2 parts of the pigment product of Example 2 was substituted for the 8 parts of the product of Example 1 in the preparation of the product of Example 4, deducting the difference from the high solvency petroleum naphtha.

Still another equivalent tinting enamel was produced when the pigment product of Example 3 was substituted for the pigment product of Example 1 on the basis of $Fe_2O_3$ content in the preparation of the lacquer product of Example 4.

While the designation "sludge" ordinarily suggests discard material, the pigment sludge derived as the residue in the centrifugal fractionation of the fatty acid treated intermediate product has value as a pigment material. The sludge substituted for the beneficiated pigment product of Example 1 in the preparation of the coating composition of Example 4 at an equivalent content of $Fe_2O_3$ and also at a content of 3.5% $Fe_2O_3$ produced useful compositions. These products did not exhibit the superior transparency, brilliance, and two-tone effect which resulted from the use of the beneficiated pigment, but these sludge-containing products were not significantly inferior in appearance when compared with the control enamels formulated at the same pigment levels with pigment corresponding to the starting hydrous ferric oxide pigment from which the pigment sludge and the beneficiated pigment product were derived.

EXAMPLE 5

*Alkyd resin enamel*

| First portion: | Parts by wt. |
|---|---|
| Pigment product of Example 1—40% non-volatile content | 29.5 |
| Calcium naphthenate solution 4% | 1.5 |
| Xylol | 12.9 |
| Second portion: | |
| Soya oil modified alkyd resin—55% non-volatile in hydrocarbon solvent | 56.1 |
| | 100.0 |

The alkyd resin was 46% oil length soya oil modified glyceryl phthalate resin and had an acid number of about 25 and a hydroxyl content corresponding to .9% of glycerine. The solvent consisted of a mixture consisting of 85% by weight of high solvency naphtha characterized by a boiling range of 130° C. to 195° C. and an aniline point of —13° C. and 15% of mineral spirits.

The ingredients of the first portion were mixed 30 minutes and then the second portion was slowly added thereto with agitation and mixed until uniform.

EXAMPLE 6

Acrylic resin enamel

| First portion: | Parts by wt. |
|---|---|
| Pigment product of Example 1—40% non-volatile content | 10.9 |
| Toluol | 14.0 |
| Acrylic resin solution—40% non-volatile content | 12.4 |
| Second portion: | |
| Acrylic resin solution—40% non-volatile content | 29.3 |
| "Santicizer" 160—benzyl butyl phthalate | 6.4 |
| Dispersion of "Bentone" 34—organophilic montmorillonite clay—30.2% non-volatile content | 27.0 |
| | 100.0 |

The acrylic resin solution was a copolymer of 98 parts methyl methacrylate and 2 parts methacrylic acid at 40% copolymer content in a mixture consisting of 40% acetone and 60% toluol by weight. This copolymer had an average molecular weight of about 80,000 and the viscosity of the indicated solution was about 45 poises.

The dispersion of "Bentone" 34 consisted of 7% of this organophilic treated montmorillonite clay dispersed in the presence of 23.2% of methyl methacrylate homopolymer in solution in a solvent mixture consisting of 60% xylol, 25% toluol and 15% acetone by weight. This homopolymer had an average molecular weight of about 80,000.

The ingredients of the first portion were mixed together with agitation for five hours at 50° C. Then the ingredients of the second portion were slowly added to the first portion and mixed until uniform.

EXAMPLE 7

Alkyd resin enamel

| First portion: | Parts by wt. |
|---|---|
| Pigment product of Example 1—40% non-volatile content | 13.8 |
| Xylol | 30.4 |
| Second portion: | |
| Coconut oil modified alkyd resin solution—67% non-volatile content | 30.8 |
| Third portion: | |
| Melamine/formaldehyde resin solution—55.5% non-volatile in butyl alcohol | 20.0 |
| Fourth portion: | |
| Melamine/formaldehyde resin solution—55.5% non-volatile content in butyl alcohol | 5.0 |
| | 100.0 |

The alkyd resin was a 37% oil length coconut oil modified glyceryl phthalate resin having an acid number of about 10 and a hydroxyl number corresponding to 5.6% of glycerine. This resin was 67% non-volatile content in a mixture of 50% by weight of toluol and 50% high solvency naphtha having a boiling range of 150° C. to 190° C. and an aniline point of −28° C.

The melamine/formaldehyde resin was equivalent to American Cyanamid's "Melmac" 248–8 except for the composition of the volatile diluent.

The first portion was mixed about 20 minutes and the second portion was slowly added thereto and mixed for one hour. Then the third portion was added and mixed for one hour and finally the fourth portion was added and the entire composition was mixed for one hour.

These several coating compositions evaluated in comparison with corresponding controls formulated with either the parent hydrous ferric oxide pigment transferred by ordinary means to the hydrophobic organic vehicle without centrifugal fractionation or commercially available flushed hydrous iron oxide pigments bases were found to be consistently and significantly better than the controls in reference to brilliance, clarity and jetness of color with and without the presence of metal flake pigment and to exhibit greater two-tone effect when formulated as a metallic finish. The resulting finishes derived from these compositions on loss of volatile solvent with drying or curing under ordinary conditions were found to be durable on exposure to the weather and exhibited physical properties at least equal to those of the control finishes. The beneficiated pigment of this invention produced desirable improvements in the appearance of the finishes without alteration in serviceability and durability.

While there are disclosed above only a limited number of preferred beneficiated pigment compositions, methods for their preparation and coating compositions containing the same, it is possible to produce still other operative compositions without departing from the inventive concept herein disclosed, and it is desired therefore that only such limitations be imposed on the appended claims as are stated therein or required by the prior art.

I claim:

1. A method of preparing a hydrophobic colloidal hydrous iron oxide pigment composition which comprises (a) mixing and reacting at an elevated temperature a parent water-wet hydrous iron oxide pigment pulp and a solution of at least one $C_6$ to $C_{24}$ hydrophobic aliphatic fatty monocarboxylic acid in a volatile, liquid, water-immiscible, non-reactive organic diluent comprising a solvent for said hydrophobic monocarboxylic acid, (b) removing free water from the resulting magma of hydrophobic hydrous iron oxide pigment particles by a combination of operations including settling said magma and decanting the resulting supernatant aqueous layer as the initial operation in water removal and azeotropic distillation of an azeotrope of water and at least one component of said volatile water-immiscible organic diluent to substantially complete separation of free water as the final operation in water removal, and (c) subjecting the resulting dewatered azeotropic distillation residue consisting essentially of said hydrophobic hydrous iron oxide pigment particles, said hydrophobic aliphatic monocarboxylic acid and said volatile, liquid, water-immiscible organic diluent to particle-size fractionation of said hydrophobic pigment particles by centrifugal means under conditions equivalent to a centrifugal force corresponding from 6000 times the force of gravity applied for a period of 30 minutes to 70,000 times the force of gravity applied for 2 minutes, one pigment fraction of hydrophobic colloidal hydrous iron oxide pigment having pigment particles characterized by a particle diameter below that which scatters ordinary light being thereby retained as a dispersion in said organic solvent and a second pigment fraction containing pigment particles having a pigment diameter which scatters ordinary light being separated thereby as a centrifugal sludge, said parent water-wet hydrous iron oxide pigment being characterized by the presence of pigment particles of light-scattering and non-scattering dimensions, an average particle-size diameter less than 100 milli-microns and a pigment particle-size distribution ranging from about 1 millimicron up to about 300 millimicrons diameter, said hydrophobic aliphatic monocarboxylic acid being charged in the proportion of from 0.2 part to 1.2 parts by weight of said hydrophobic acid per part by weight of $Fe_2O_3$ ash of said water-wet parent hydrous iron oxide pigment, said volatile liquid water-immiscible organic diluent being present in said step (a) in an amount of 25% to 75% based on the total weight of said hydrophobic monocarboxylic acid, the dry weight of said parent pigment pulp and said volatile organic diluent, mixing and reacting in said step (a) being at an elevated temperature up to the boiling point of the volatile constituents of the aqueous charge for a period ranging from 15 minutes to about 480 minutes, the reaction product of said step (a) having from 30% to 99% of said charge of hydrophobic aliphatic monocarboxylic acid chemically bound to the surface of said resulting hydrophobic hydrous iron oxide pigment particles and correspondingly from 70% to 1% of said hydrophobic monocarboxylic acid being in the uncombined free state in solution in said organic diluent.

2. The method of claim 1 wherein said step (a), said hydrophobic acid component consists essentially of at least one saturated aliphatic fatty monocarboxylic acid having from 8 to 16 carbon atoms per molecule present in an amount of from 0.3 to 0.8 part for each part by weight of $Fe_2O_3$ ash content of said parent hydrous iron oxide pigment, said volatile liquid water-immiscible organic diluent consisting of a hydrocarbon solvent having a boiling range in the temperature range of from 80° C. to 200° C., and said mixing and reacting being carried out at a temperature in the range of about 50° C. to about 70° C. with moderate agitation for a period of 30 to 60 minutes.

3. The method of claim 2 wherein said hydrophobic acid component consists essentially of lauric acid and said volatile organic diluent therefor is xylol.

4. The method of claim 1 wherein said water-removal step (b), said initial operation consists essentially of gravitational settling of said magma of said hydrophobic hydrous iron oxide pigment particles for about 15 minutes, thereby forming a supernatant aqueous layer containing a preponderance of the water present in said magma and a fluid organic hydrophobic hydrous iron oxide pigment composition, and removing said supernatant layer by decantation.

5. The method of claim 1 wherein said pigment-particle-size fractionation step (c) consists essentially of subjecting said azeotropic distillation residue from said final operation of said water-removal step (b) to centrifugal separating means wherein said hydrophobic pigment particles are under a centrifugal force in the range of from about 9000 to about 16,000 times the force of gravity, said azeotropic distillation residue being supplied to said centrifugal means at a total non-volatile content in the range of about 25% to 45% by weight and correspondingly a volatile content of 75% to 55% by weight of said volatile liquid water-immiscible organic diluent and at a feed-rate which provides a pigment particle settling time of from about 6 minutes to about 18 minutes.

6. The method of claim 5 wherein said pigment-particle-size fractionation step (c) consists essentially of supplying said azeotropic distillation residue to said centrifugal separating means at a rate ranging from about 10 gallons per hour with centrifugal separating means having a centrifugal force of 9000 times the force of gravity to about 75 gallons per hour with centrifugal separating means having a centrifugal force of 16,000 times the force of gravity.

7. A hydrophobic colloidal hydrous iron oxide pigment composition comprising hydrophobic colloidal hydrous iron oxide pigment particles, non-scattering to ordinary light, having chemically bound thereto as a molecularly thin surface coating of at least one hydrophobic aliphatic fatty monocarboxylic acid having from 6 to 24 carbon atoms per molecule, free hydrophobic aliphatic $C_6$–$C_{24}$ monocarboxylic acid, and a non-reactive, water-immiscible, volatile liquid diluent essentially comprising a solvent for said free hydrophobic monocarboxylic acid, said hydrophobic colloidal pigment composition being a fractional derivative composition consisting mainly of said hydrophobic pigment particles of a size non-scattering to ordinary light and being free of pigment particles which settle under applied centrifugal force equivalently corresponding from 6000 times the force of gravity applied for 30 minutes to 70,000 times the force of gravity applied for 2 minutes, said fractional derivative having as the parent whole composition thereof a hydrophobic pigment composition containing hydrophobic hydrous iron oxide pigment particles having a molecularly thin surface coating of said hydrophobic monocarboxylic acid chemically bound to hydrous iron oxide pigment cores thereof, said pigment cores ranging in particle diameter distribution from 1 millimicron to 300 millimicrons, the average particle diameter of said pigment cores being less than 100 millimicrons, including said pigment particles which are light scattering to ordinary light and said pigment particles which are non-light-scattering, said parent whole composition having a total of from 0.2 to 1.2 parts by weight of said hydrophobic monocarboxylic acid, including said free acid and said hydrophobic acid chemically bound to said pigment particles, per part $Fe_2O_3$ ash content by weight of said parent hydrous iron oxide pigment, from 1% to 70% of said hydrophobic monocarboxylic acid being in said free state and correspondingly from 99% to 30% being in said surface bound state.

8. The hydrophobic pigment product of claim 7 wherein said hydrous iron oxide core pigment is hydrous ferric oxide.

9. The hydrophobic pigment product of claim 7 wherein said hydrophobic aliphatic monocarboxylic acid consists essentially of lauric acid.

10. The hydrophobic pigment product of claim 7 wherein said hydrophobic aliphatic monocarboxylic acid consists essentially of tall oil fatty acids.

11. The hydrophobic colloidal hydrous iron oxide pigment product of claim 7 wherein said hydrous iron oxide is hydrous ferric oxide, said hydrophobic monocarboxylic acid component consists essentially of at least one hydrophobic saturated aliphatic fatty monocarboxylic acid containing from 8 to 16 carbon atoms per molecule and present in an amount in excess of that required to cover 40% of the surface area of said hydrous ferric oxide core pigment particles with a mono-molecularly thin chemically-bound coating of said hydrophobic saturated aliphatic monocarboxylic acid up to 1.2 parts of said hydrophobic monocarboxylic acid based on the weight of the $Fe_2O_3$ ash content of said hydrous ferric oxide pigment, and said volatile organic diluent is a hydrocarbon solvent having a boiling range in the temperature range of 80° C. to about 200° C.

12. The hydrophobic pigment product of claim 11 wherein said hydrophobic aliphatic monocarboxylic acid component consists essentially of lauric acid and the total non-volatile content, including said hydrophobic colloidal hydrous ferric oxide pigment particles and an amount of said hydrophobic aliphatic monocarboxylic acid which is free and uncombined with said hydrophobic pigment particles, is in the range of 25% to 50% based on the total weight of the composition.

13. The hydrophobic pigment product of claim 12 wherein from 1 to 70% by weight of the total content of said lauric acid is present as free lauric acid and correspondingly from 99% to 30% is present as said molecularly-thin hydrophobic coating of lauric acid bound to the surface of said hydrous ferric oxide core pigment particles.

14. A liquid coating composition comprising a solvent-soluble hydrophobic non-volatile organic film-forming material, a volatile liquid organic diluent including at least one solvent for said film-forming material, and the hydrophobic colloidal hydrous iron oxide pigment product of claim 7, said film-forming material being capable of deposition from solution in said volatile organic diluent as a clear, transparent film on volatile removal of said diluent from said solution.

15. The liquid coating product of claim 14 having from 5 to 50 parts, on a non-volatile basis, of said hydrophobic colloidal hydrous iron oxide pigment composition for each 100 parts by weight of said organic film-forming material, the total non-volatile content of the liquid coating composition being from 5% to 60% by weight.

16. The liquid coating product of claim 15 which further includes up to about 1% by weight of reflective metallic aluminum pigment particles, the concentration of said aluminum pigment particles being less than that required to provide the dried coating of said liquid coating composition with metallic opacity.

17. The liquid coating product of claim 14 wherein said non-volatile organic film-forming material consists essentially of cellulose nitrate and at least one compatible plasticizer for the cellulose nitrate.

18. The liquid coating product of claim 14 wherein said non-volatile organic film-forming material consists essentially of a mixture of a short oil length coconut oil modified glyceryl-phthalate alkyd resin having an acid number of about 10 and a hydroxyl number corresponding to about 5.6% of glycerine and a melamine-formaldehyde condensate resin in the proportion of about 0.67 part by weight per part by weight of said coconut oil modified alkyd resin.

References Cited in the file of this patent

UNITED STATES PATENTS

| | | |
|---|---|---|
| 284,718 | Buckalew et al. | Sept. 11, 1883 |
| 317,367 | Jessup | May 5, 1885 |
| 609,936 | Ismay | Aug. 30, 1898 |
| 1,986,029 | Todd et al. | Jan. 1, 1935 |
| 2,134,741 | Silleck | Nov. 1, 1938 |
| 2,140,745 | Hucks | Dec. 20, 1938 |
| 2,271,323 | Yee | Jan. 27, 1942 |
| 2,335,760 | Hucks | Nov. 30, 1943 |
| 2,405,953 | Hillery | Aug. 20, 1946 |
| 2,457,847 | Stubblebine | Jan. 4, 1949 |
| 2,642,404 | Pike | June 16, 1953 |

FOREIGN PATENTS

| | | |
|---|---|---|
| 253,454 | Switzerland | Mar. 15, 1948 |
| 4,870 | Great Britain | of 1893 |
| 564,992 | Great Britain | Oct. 23, 1944 |
| 125,364 | Australia | Sept. 8, 1947 |